(12) United States Patent
Park et al.

(10) Patent No.: US 8,239,895 B2
(45) Date of Patent: Aug. 7, 2012

(54) PMCP EXTENSION METADATA, DATA STREAM GENERATING DEVICE, DIGITAL DATA BROADCASTING EMISSION SYSTEM AND DIGITAL DATA BROADCASTING EMISSION METHOD THEREOF

(75) Inventors: Min-Sik Park, Daejon (KR); Yong-Ho Kim, Daejon (KR); Jin-Woo Hong, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 625 days.

(21) Appl. No.: 12/064,283

(22) PCT Filed: Aug. 22, 2006

(86) PCT No.: PCT/KR2006/003292
§ 371 (c)(1),
(2), (4) Date: Feb. 20, 2008

(87) PCT Pub. No.: WO2007/024084
PCT Pub. Date: Mar. 1, 2007

(65) Prior Publication Data
US 2008/0235723 A1 Sep. 25, 2008

(30) Foreign Application Priority Data
Aug. 22, 2005 (KR) .................. 10-2005-0076723

(51) Int. Cl.
*G06F 13/00* (2006.01)
*H04N 7/173* (2006.01)
*G04N 13/00* (2006.01)
(52) U.S. Cl. ................ 725/54; 725/116; 725/39
(58) Field of Classification Search .......... None
See application file for complete search history.

(56) References Cited

U.S. PATENT DOCUMENTS
6,763,522 B1 * 7/2004 Kondo et al. .............. 725/39
2002/0035726 A1 * 3/2002 Corl ........................... 725/39
2002/0059583 A1 5/2002 Kim
(Continued)

FOREIGN PATENT DOCUMENTS
CN 1419380 A 5/2003
(Continued)

OTHER PUBLICATIONS

Ji Hoon Choi, et al; "Design of PSIP converter for data broadcasting service in the interoperable network of terrestrial and cable", Intelligent Signal Processing and Communication Systems, 2004. ISPACS 2004, pp. 604-607, Nov. 2004.

(Continued)

*Primary Examiner* — Brian Pendleton
*Assistant Examiner* — Jean D Saint Cyr
(74) *Attorney, Agent, or Firm* — Ladas & Parry LLP

(57) ABSTRACT

Provided are a PMCP extended metadata for securing interoperability among devices constituting a digital data broadcasting emitting system, a data stream generating device using the same, a digital data broadcasting emitting system and a digital data broadcasting emitting method. The PMCP extended metadata includes: a channel metadata for providing system information of data events constituting a data broadcasting program; a program and system information protocol (PSIP) data event metadata for providing identification information and program guide of data events; and an advanced television system committee (ACAP) data service metadata for providing encoding information including signaling information and transmission protocol information of data broadcasting contents corresponding to data events.

25 Claims, 13 Drawing Sheets

U.S. PATENT DOCUMENTS

2007/0022459 A1*   1/2007   Gaebel et al. .............. 725/114
2007/0040934 A1*   2/2007   Ramaswamy et al. ..... 348/385.1

FOREIGN PATENT DOCUMENTS

| | | | |
|---|---|---|---|
| CN | 1606295 | A | 4/2005 |
| CN | 1620643 | A | 5/2005 |
| JP | 2002-330420 | A | 11/2002 |
| JP | 2004-289629 | A | 10/2004 |
| KR | 1020030070407 | | 8/2003 |
| KR | 1020040058458 | A | 7/2004 |
| KR | 1020040044679 | | 5/2005 |
| KR | 1020050046368 | A | 5/2005 |
| WO | 2005/076616 | A1 | 8/2008 |

OTHER PUBLICATIONS

Young Kyung Park, et al; "Implementation of PSIP Generating System for Data Broadcasting Based on PMCP", Advanced Communication Technology, 2005, ICACT 2005. The 7$^{th}$ International Conference, vol. 2, pp. 1175-1178, Feb. 2005.

Minsik Park, et al; "Data Broadcast Metadata Based on PMCP for Open Interface to a DTV Data Server", PCM 2005, 6$^{th}$ Pacific-Rim Conference on Multimedia, pp. 234-245, Nov. 13-16, 2005.

PMCP Standard; "New Candidate Standard Makes Quick and Easy Connections: Programming Metadata Communication Protocol", ATSC, vol. 4, Issue No. 4, Dec. 2003; 8 pages.

* cited by examiner

```xml
<?xml version="1.0" encoding="UTF-8" ?>
<!-- Sample PMCP file for Damo, Two Directory-->
<PmcpMessage id="100004" origin="Streaming_Controller" originType="Traffic" dateTime="2004-12-14T04:28:00+09:00"
destination="ACAP_Data_Server" type="information" xmlns="http://www.atsc.org/pmcp/2004/2.1" xmlns:xsi=
"http://www.w3.org/2001/XMLSchema-instance" xsi:schemaLocation="http://www.atsc.org/pmcp/2004/2.1 PMCP2.1.2.xsd">
    <Channel channelNumber="11-1" tsid="101" programNumber="1" sourceId="1" pmtPid="72" pcrPid="48" action="add">
        <ElementaryStream pid="210" type="11">
            <CarouselIdentifier carouselId="1000" moduleId="0" blockSize="4058" objectKey="0" />
            <StreamIdentifier componentTag="0" />
            <AssociationTag associationTag="0" />
        </ElementaryStream>
        <ElementaryStream pid="260" type="5">
            <ApplicationSignaling applicationType="ACAP-J" />
        </ElementaryStream>
        <ElementaryStream pid="48" type="2" />
        <ElementaryStream pid="49" type="129" audioId="1" />
    </Channel>
    <PsipDataEvent startTime="2005-10-27T04:30:00+09:00" duration="PT50M" action="add">
        <DataId channelNumber="11-1">
            <PsipDataId dataId="101" />
        </DataId>
        <ContentId>
            <HouseNumber>1000023ddd</HouseNumber>
        </ContentId>
    </PsipDataEvent>
    <AcapDataService action="add">
        <ContentId>
            <HouseNumber>1000023ddd</HouseNumber>
        </ContentId>
        <AcapApplicaiton applicationType="ACAP-J">
            <Application organizationId="1" applicationId="1" controlCode="AUTOSTART">
                <Name lang="kor">Damo</Name>
                <ApplicationInfo serviceBound="1" visibility="1" priority="1">
                <ProtocolLabels protocolLabel="1" />
                <AcapJApp parameter="ACAP" />
                <AcapJAppLocation baseDirectory="/Damo" classpathExtension="" initialClass="XletMain.class" />
            </Application>
            <!-- applicationType="6" for ACAP-J-->
            <TransportProtocol protocolLabel="1" sourceId="1" componentTag="0" />
            <!-- protocolId="6" for ACAP ObjectCarousel -->
        </AcapApplicaiton>
        <AcapObjectCarousel carouselId="1000">
            <DataCarousel>
                <Dsi moduleId="0" objectKey="0" associationTag="0" />
                <!-- DSI Message for DII1 -->
                <Dii identification="100" blockSize="4066">
            <DataCarousel>
            <ObjectCarousl>
                <ServiceGateway objectId="0" objectKey="0">
                    <!-- Servicegateway Message -->
                    <Bindings objectId="1" name="Damo" kind="dir">
                    <!-- Directory 1 Message -->
                    <BiopProfileBody carouselId="1000" moduleId="0" objectKey="1" associationTag="0" identification="100"/>
                    </Bindings>
                </ServiceGateway>
                <Directory objectId="1" objectKey="1">
                    <!-- Directory 1 Message -->
                    <Bindings objectId="2" name="XletMain.class" kind="fil" contentSize="1000">
                    <Bindings objectId="3" name="Display.class" kind="fil" contentSize="1000">
                    <Bindings objectId="4" name="Show.png" kind="fil" contentSize="1000">
                </Directory>
                <File objectId="2" objectKey="2" name="XletMain.class" pathName="/Damo" fileId="1000">
                    <!-- File 1 Message -->
                    <ContentType contentTypeData="application/java" transparencyLabel="Transparent" />
                </File>
                <File objectId="3" objectKey="3" name="Display.class" pathName="/Damo" fileId="2000">
                <File objectId="4" objectKey="4" name="Show.png" pathName="/Damo" fileId="3000">
            </ObjectCarousel>
        </AcapObjectCarousel>
    </AcapDataService>
</PmcpMessage>
```

FIG. 13

PMCP EXTENSION METADATA, DATA STREAM GENERATING DEVICE, DIGITAL DATA BROADCASTING EMISSION SYSTEM AND DIGITAL DATA BROADCASTING EMISSION METHOD THEREOF

TECHNICAL FIELD

The present invention relates to a metadata for securing interoperability among devices of a digital data broadcasting emitting system, a data stream generating device using the same, a digital data broadcast emitting system and a digital data broadcast emitting method. More particularly, the present invention relates to a metadata structure for securing interoperability between devices of a conventional digital broadcast emitting system and a data server, added to the conventional digital broadcast emitting system for emit a data broadcast, based on a programming metadata communication protocol (PMCP), a data stream generating device using the same, a digital data broadcast emitting system and a digital data broadcast emitting method.

BACKGROUND ART

As broadcasting have evolved from analog to digital, a digital broadcasting emitting system has been required to transmit system information (SI) and program guide (PG) of broadcasting programs to viewers through a broadcasting channel in order to allow the viewers to conveniently search and select a desire broadcasting program.

The advanced television system committee (ATSC) defines a program and system information protocol (PSIP) to transmit the system information (SI) and the program guide (PG) as a transport stream (TS) based on a MPEG-2 system standard.

FIG. 1 is a block diagram illustrating a system defined by a program metadata communication protocol PMCP. The ATSC designates a broadcasting emitting system that transmits the SI and PG of broadcasting programs through a transport stream based on the PSIP as a PSIP server or a PSIP generator. PSIP information is firstly composed by a program director through a program management system, and the composed PSIP information is transmitted to a PSIP server. The composed PSIP information may be updated, added or deleted if a broadcasting schedule changes before finally transmitting corresponding broadcasting programs.

The broadcasting schedule changes in a broadcasting transmission controlling device such as a traffic system, an automation system, and a MPEG controller. Accordingly, the broadcasting transmission controlling device must have a capability of notifying the changes of the broadcasting schedule to the PSIP server so the PSIP server updates the PSIP information with the changed program guide.

Since interfaces for exchanging program guide with modified information were independently defined by operators, interoperability among digital broadcasting emitting systems developed by many companies, that is, interoperability between a broadcasting transmission controlling device and the PSIP server, cannot be secured. This causes the increase of effort and cost to embody an interface between broadcasting devices when a broadcasting emitting system is built in a view of an operator or a developer of a digital broadcasting emitting system.

In order to overcome the problem described above, the ATSC defines ATSC A/76 standard, the PMCP. The PMCP introduces a metadata structure for exchanging standard PSIP information among devices constituting a digital broadcasting emitting system and a emitting method.

FIG. 2 is a metadata structure defined in a PMCP. As shown in FIG. 2, the structure of the PMCP metadata 200 includes a message state metadata 210, a transport stream metadata 220, a channel metadata 230, a show metadata 240, a PSIP event metadata 250, a time metadata 260, a rating metadata 270 and a private PMCP information metadata 280. The message state metadata 210 describes the validity of a transmitted message and a processing state. The transport stream metadata 220 describes the information of transport stream. The channel metadata 230 describes a virtual channel and channel tuning information. The show metadata 240 describes a play list of shows used to a program guide. The PSIP event metadata 250 describes a program guide. The time metadata 260 describes system time information. The rating metadata 270 describes ratings of broadcasting programs. The private PMCP information metadata 280 describes system level information defined by a PMCP user.

The PMCP metadata 200 describes information for the PSIP server to generate a transport stream for transmitting PSIP/PSI, where PSI stands for program specific information. That is, the PMCP was designed to provide a metadata for a broadcasting emitting system to transmit PSIP/PSI which is system information and program guide only for audio/video broadcasting programs in a digital broadcasting environment. The audio/video broadcasting program refers a broadcasting program that is composed of audio only, video only, or audio and video.

The conventional digital broadcasting environment simply provides audio/video broadcasting programs to viewers. Such a conventional digital broadcasting environment has evolved to a digital data broadcasting environment that provides not only audio/video broadcasting programs but also various related services to views by transmitting data with the audio/video broadcasting programs.

In order to provide a data broadcasting service, it requires a conventional digital broadcasting emitting system to have a data broadcasting transmission device for encoding data broadcasting contents according to a data broadcasting protocol and outputting the encoded data broadcasting contents as a MPEG-2 transport stream. The data broadcasting transmission device is designated as a data server 160 or a data stream generator in general.

The data server must receive program guide and encoding information for generating data stream as like the PSIP server for a digital service. The broadcasting transmission controlling device such as a traffic system, an automation system, and a MPEG control system must have capability of modifying program guide and encoding information.

Since the conventional PMCP does not describe the program guide and encoding information for data broadcasting, the conventional PMCP is not suitable as an interface of a data broadcasting emitting system to secure the interoperability for data broadcasting transmission. Therefore, there is a demand for a system and method for securing the interoperability between the data server, which is newly added for data broadcasting, and other broadcasting devices for transmitting data broadcasting programs.

DISCLOSURE

Technical Problem

It is, therefore, an object of the present invention to provide a metadata structure for securing interoperability between a conventional digital broadcasting emitting system and a data server, added to the conventional digital broadcasting emitting system for transmitting a data broadcasting, based on a programming metadata communication protocol (PMCP), a data stream generating device using the same, a digital data broadcasting emitting system and a digital data broadcasting emitting method.

Technical Solution

In accordance with one aspect of the present invention, there is provided a program metadata communication protocol (PMCP) extended metadata includes: a channel metadata for providing system information of data events constituting a data broadcasting program; a program and system information protocol (PSIP) data event metadata for providing identification information and program guide of data events; and an advanced television system committee (ACAP) data service metadata for providing encoding information including signaling information and transmission protocol information of data broadcasting contents corresponding to data events.

Advantageous Effects

In the present invention, a conventional PMCP metadata structure is extended by adding a metadata for transmitting data broadcasting thereto. The PMCP extended meat data according to the present invention secures interoperability between a data server and a broadcasting transmission controlling device.

Also, the PMCP extended metadata according to the present invention provides a control interface for updating, adding and deleting data-events between a broadcasting transmission controlling device and a data server.

DESCRIPTION OF DRAWINGS

The above and other objects and features of the present invention will become apparent from the following description of the preferred embodiments given in conjunction with the accompanying drawings, in which:

FIG. 13 is a block diagram illustrating a structure of a PMCP extended message generated using a PMCP extended metadata in accordance with an embodiment of the present invention;

BEST MODE FOR THE INVENTION

Other objects and aspects of the invention will become apparent from the following description of the embodiments with reference to the accompanying drawings, which is set forth hereinafter.

A programming metadata communication protocol (PMCP) extended metadata according to the present invention may include: a channel metadata for providing system information of data events constituting a data broadcasting program; a PSIP data event metadata for providing identification information of data event, program guide, and descriptor information of a data event table (DET); and an ACAP data service metadata for providing signaling information of data broadcasting contents corresponding to the data event, and encoding information such as transmission protocol information.

The PSIP data event metadata includes: a data event identification metadata for providing the identification information of the data event; a data event title metadata for providing a title of a data event; a data event description metadata for providing the supplementary information of data event; a data broadcasting receiving information metadata for providing necessary information to a data broadcasting receiver for receiving a corresponding data event; a DET private information metadata for receiving individually defined contents beside predefined schema related to DET; and a DET descriptor metadata for describing descriptor information of DET and providing a descriptor tag number and a descriptor content.

An announcement metadata for a data broadcasting should describe information related to a data event table (DET) defined by the ATSC, and a signaling metadata for the data broadcasting should describe AIP of an advanced common application protocol (ACAP) that is a data broadcasting standard defined by the ATSC and related PMT descriptors, and an object carousel that is a data broadcasting encoding scheme of the ACAP.

Figure 1:
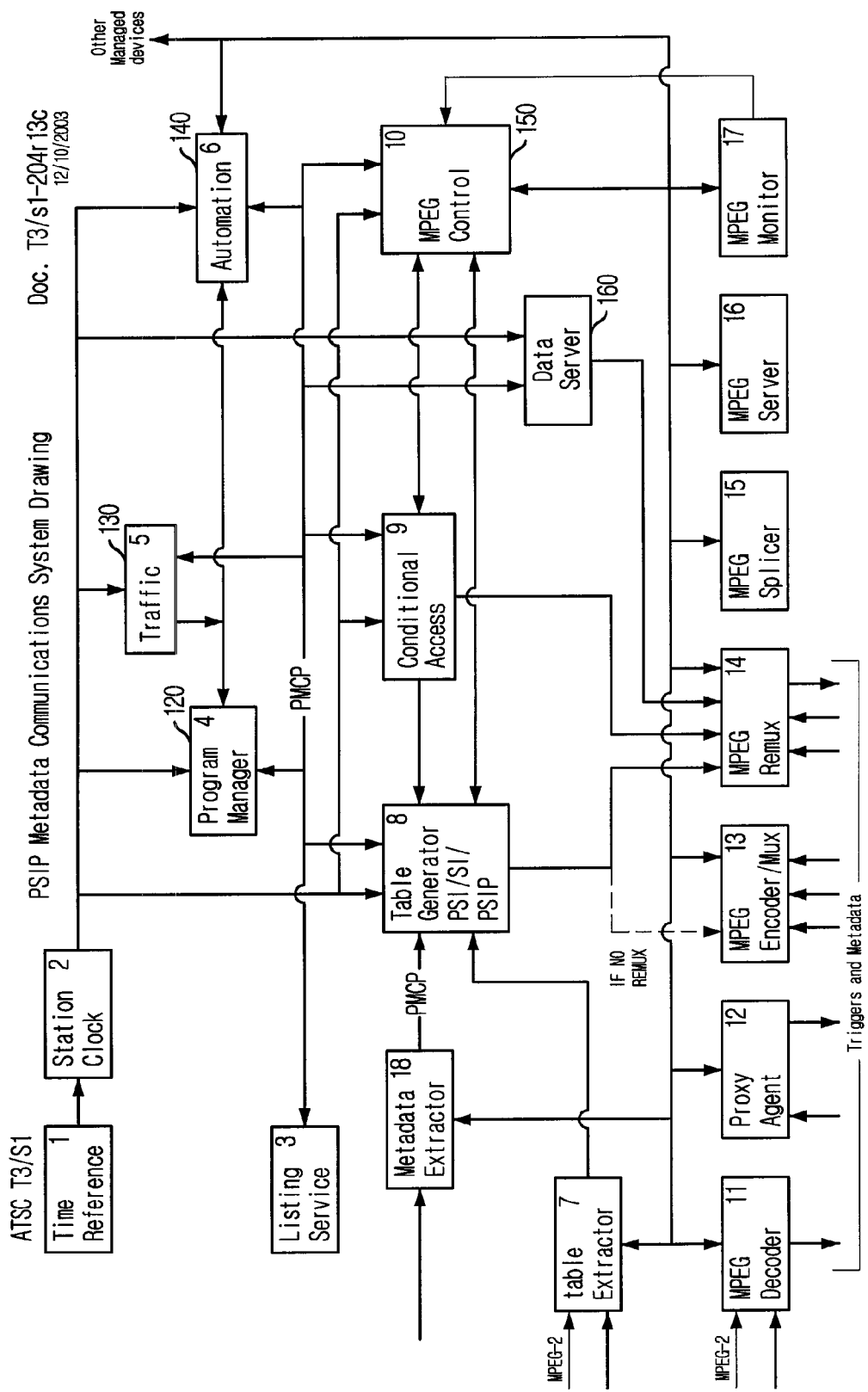
FIG. 1 is a block diagram illustrating a system defined in a PMCP.
Figure 2:
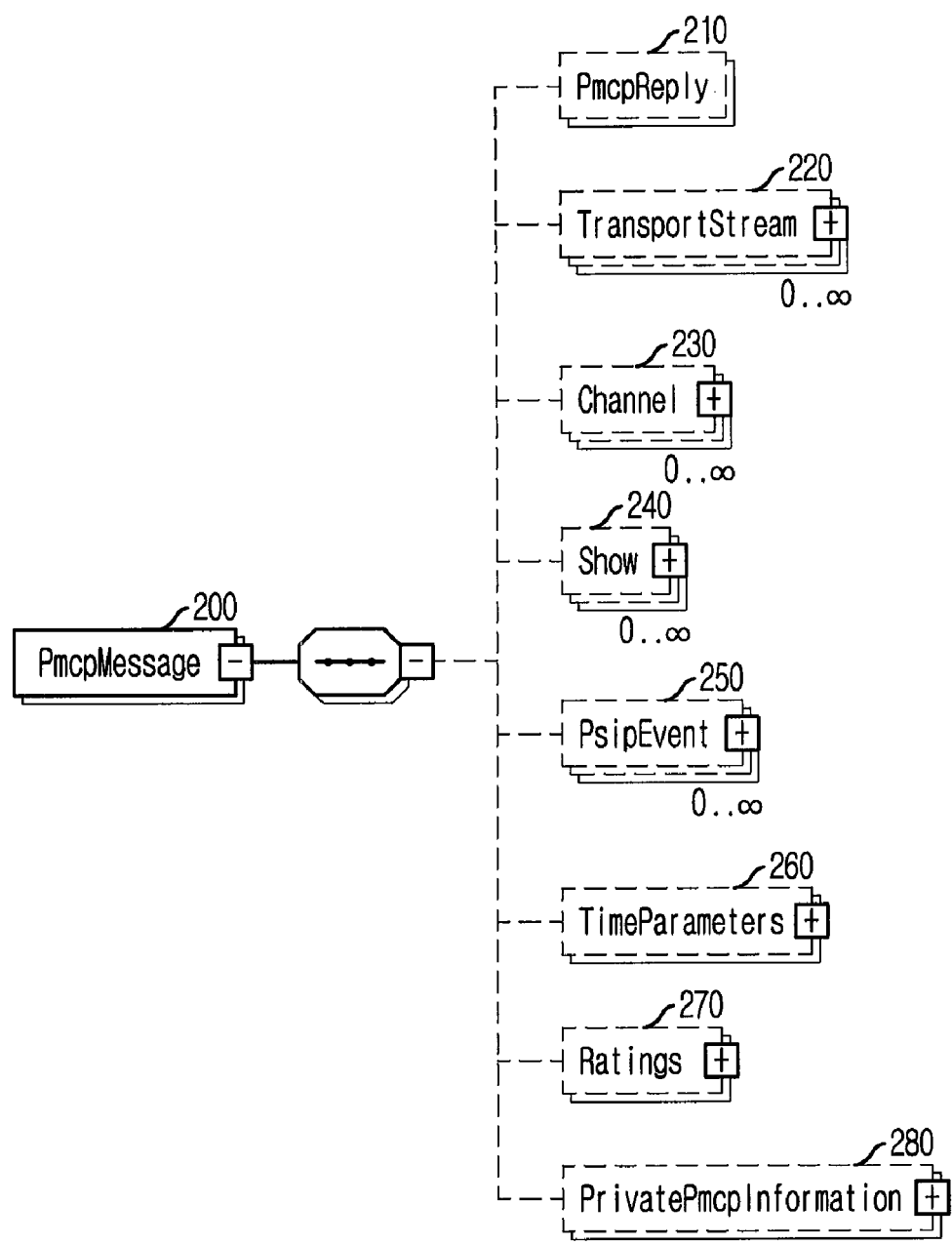
FIG. 2 is a block diagram illustrating a metadata structure defined in a PMCP.
Figure 3:
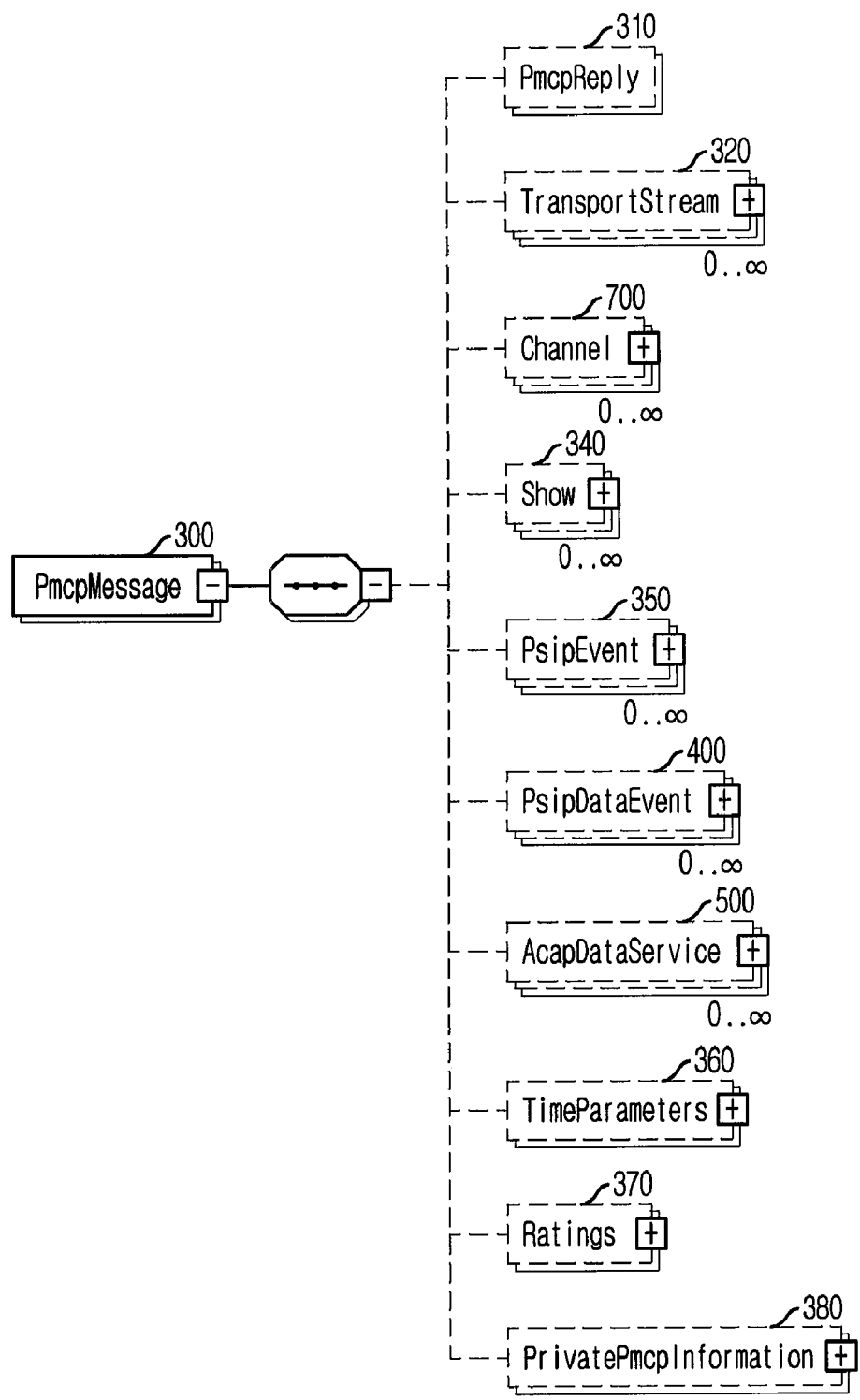
FIG. 3 is a block diagram illustrating a PMCP extended metadata structure in accordance with an embodiment of the present invention.

FIG. 3 is a block diagram illustrating a PMCP extended metadata structure in accordance with an embodiment of the present invention. As shown in FIG. 3, the PMCP extended metadata 300 has a structure extended from a conventional PMCP metadata 200 shown in FIG. 2 by adding a PSIP data event metadata 400 and an ACAP data service metadata 500 thereto. The ACAP data service metadata 500 describes information about ACAP encoding and AIT signaling.

A message state metadata 310 describes the validity of a transmitted message and the processing state of the transmitted message. A transport stream metadata 320 describes the information of transport stream. A channel metadata 700 describes not only information about a virtual channel and channel tuning but also descriptor information of a program map table (PMT). The PMT provides information about an elementary stream of a program so as to signaling applications. The ACAP prescribes the PMT in detail.

A show metadata 340 describes a play list of shows used to an AV broadcasting program guide. A PSIP event metadata 350 describes an AV broadcasting program guide. A time metadata 360 describes system time information.

A rating metadata 370 describes ratings of AV broadcasting programs. A private PMCP information metadata 380 describes system level information defined by a PMCP user.

The PSIP data event metadata 400 includes data event identification information, data broadcasting content identification information, data event title information, data event description information, data broadcasting receiving information, and data event table (DET) description information. The DET contains information about data service of a specific virtual channel. Such a DET is well described in the data broadcasting standard A/90 of the ATSC.

The PSIP data event metadata 400 includes program guides of a data event, such as starting time, and running time.

The ACAP data service metadata 500 describes encoding information of data events constituting a data broadcasting program. The ACAP data service metadata 500 includes signaling information of data service and transmission protocol information.

Figure 4:
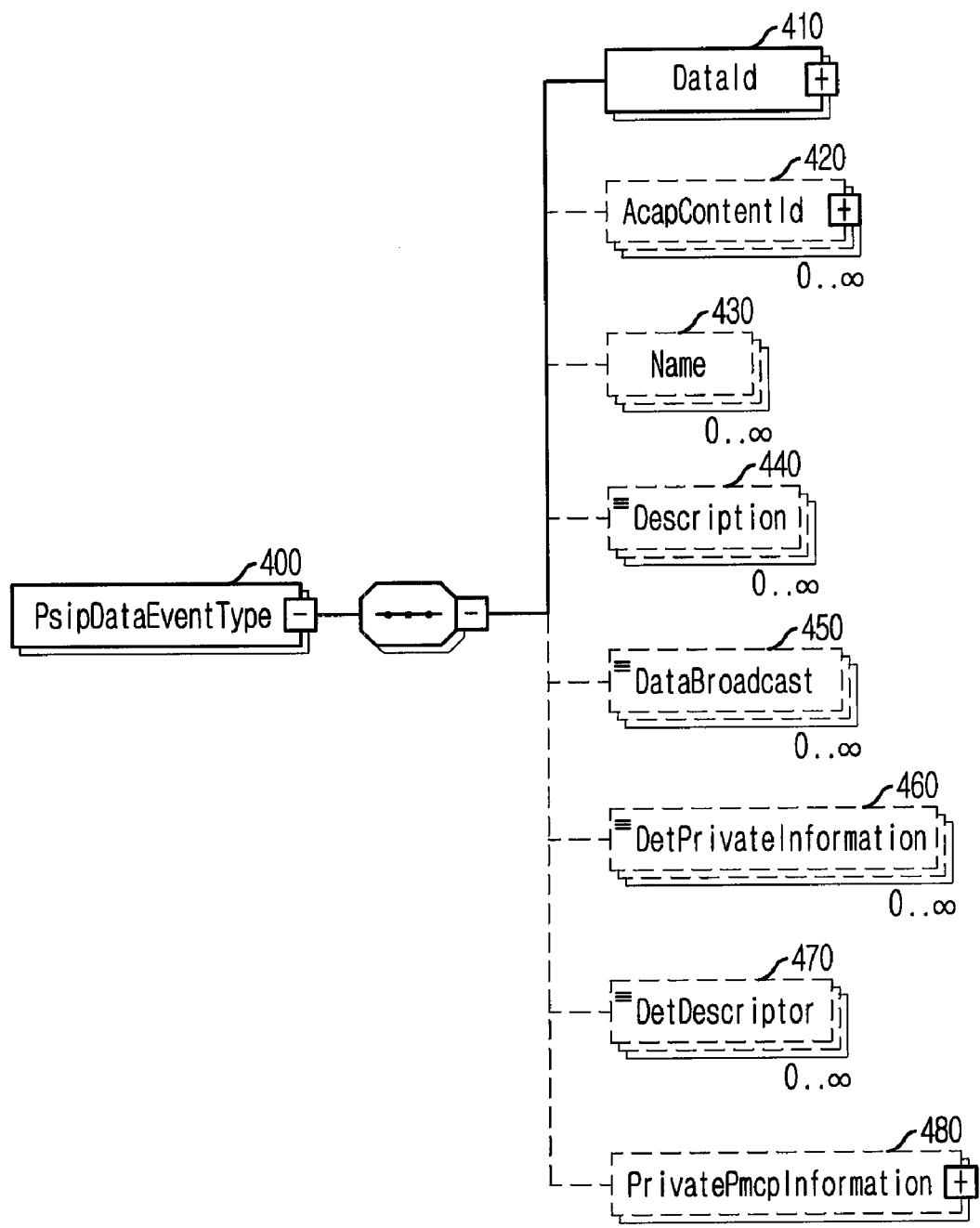
FIG. 4 is a block diagram illustrating a structure of a PSIP data event metadata of FIG. 3.

FIG. 4 is a block diagram illustrating a structure of a PSIP data event metadata of FIG. 3. As shown in FIG. 4, the PSIP data event metadata 400 describes data events constituting data broadcasting. The PSIP data event metadata 400 includes a data event identification metadata 410, a data broadcasting content identification metadata 420, a data event title metadata 430, a data event description metadata 440, a data broadcasting receiving information metadata 450, a DET private information metadata 460, a DET descriptor metadata 470, and a private pmcp information metadata 480.

The data event identification metadata 410 describes identification information of a data event, and contains a channel number corresponding to a predetermined data event and a transport stream identifier (TSID). The data event identification metadata 410 may further include one of a data ID which is a table ID included in the DET, an initial start time, and an ID allocated to a producer.

The data broadcasting content identification metadata 420 describes identification information of contents constituting data event, and includes an international standard audiovisual number (ISAN) and an ID allocated to contents by a broadcasting station.

Figure 5:
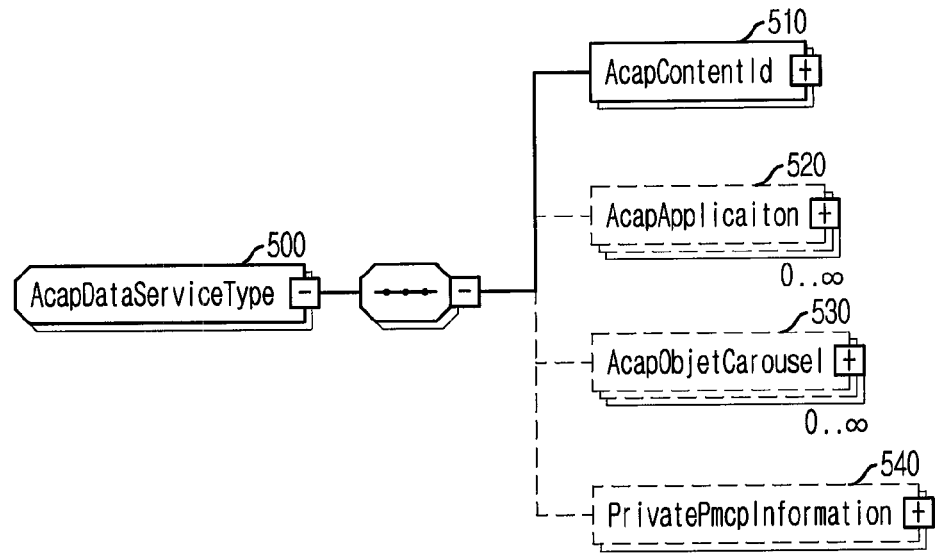
FIG. 5 is a block diagram illustrating a structure of a ACAP data service metadata of FIG. 3.

The data event title metadata 430 include titles of data events expressed as multi-languages. The data event description metadata 440 include supplementary information of data event. The DET private information metadata 460 is for recording user-defined private information beside predetermined schemas related to a DET constituting a data broadcasting program. The DET descriptor metadata 470 describes descriptor information of a DET and includes a descriptor tag number and descriptor content. FIG. 5 is a block diagram illustrating a structure of an ACAP data service metadata of FIG. 3. Referring to FIG. 5, the ACAP data service metadata 500 provides encoding information for typical data broadcasting.

The ACAP data service metadata 500 includes a content ID metadata 510 for describing a content ID of a data event, an ACAP application metadata 520 for describing signaling information for application defined at advanced common application platform (ACAP) application information table (AIT), an ACAP object carousel metadata 530 for describing information about an object carousel which is a protocol transmitting an ACAP application, and a private information metadata 540 for describing information defined by a user related to an ACAP data service.

Figure 6:
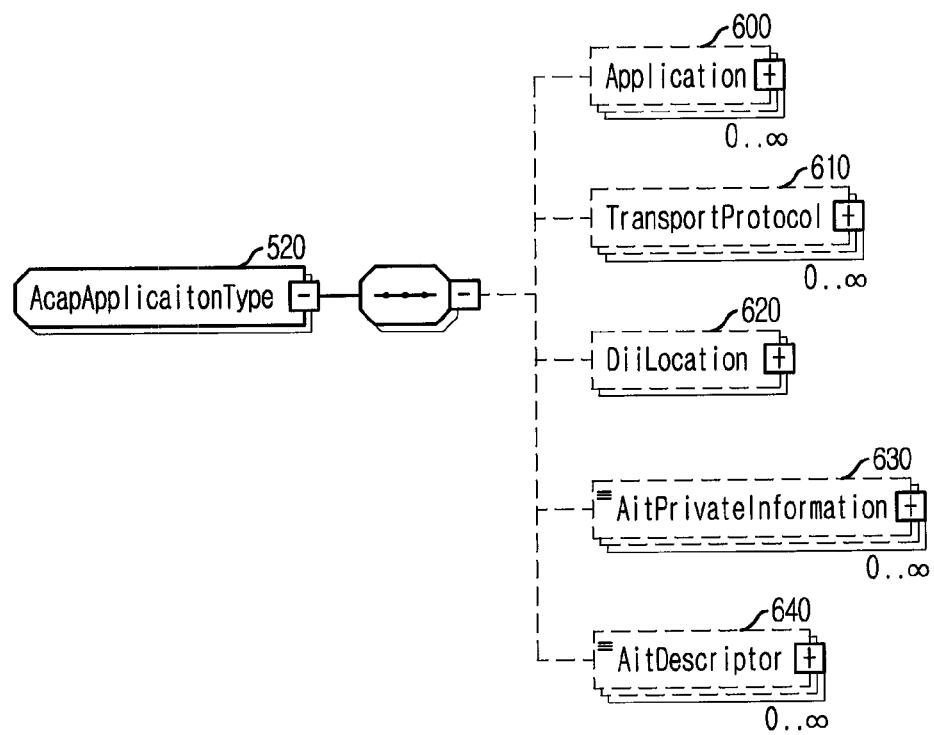
FIG. 6 is a block diagram illustrating a structure of a ACAP application metadata of FIG. 5.

FIG. 6 is a block diagram illustrating a structure of an ACAP application metadata of FIG. 5.

Referring to FIG. 6, the allocation information table (AIT) is a table describing information related to applications. The ACAP describes the AIT in detail. The ACAP application metadata 520 describes the information about the AIT. That is, the ACAP application metadata 520 an application common descriptor which is commonly applied to all ACAP data broadcasting applications described at the AIT, and an application specific descriptor that is a descriptor that can be applied to a specific ACAP data broadcasting application.

The ACAP application metadata 520 includes an application metadata 600, a transport protocol metadata 610, a DII location metadata 620, an AIT private information metadata 630, and an AIT descriptor metadata 640.

The transport protocol metadata 610 describes a download info indicator (DII) location descriptor, which is one of the application common descriptors. That is, the transport protocol metadata 610 describes the list of DII message related to the object carousel which is a transport protocol for data broadcasting application.

The application metadata 600 includes properties such as an organization ID, and an application ID for identifying each application. Also, the application metadata 600 has a control code such as an "auto-start" for auto-starting a corresponding application upon at a receiver, a "present" or a "prefetch" for temporally storing it at a cache memory without executing, and a "kill" or a "terminate" for ending an application stored in the cache memory without auto-starting the application.

Figure 7:
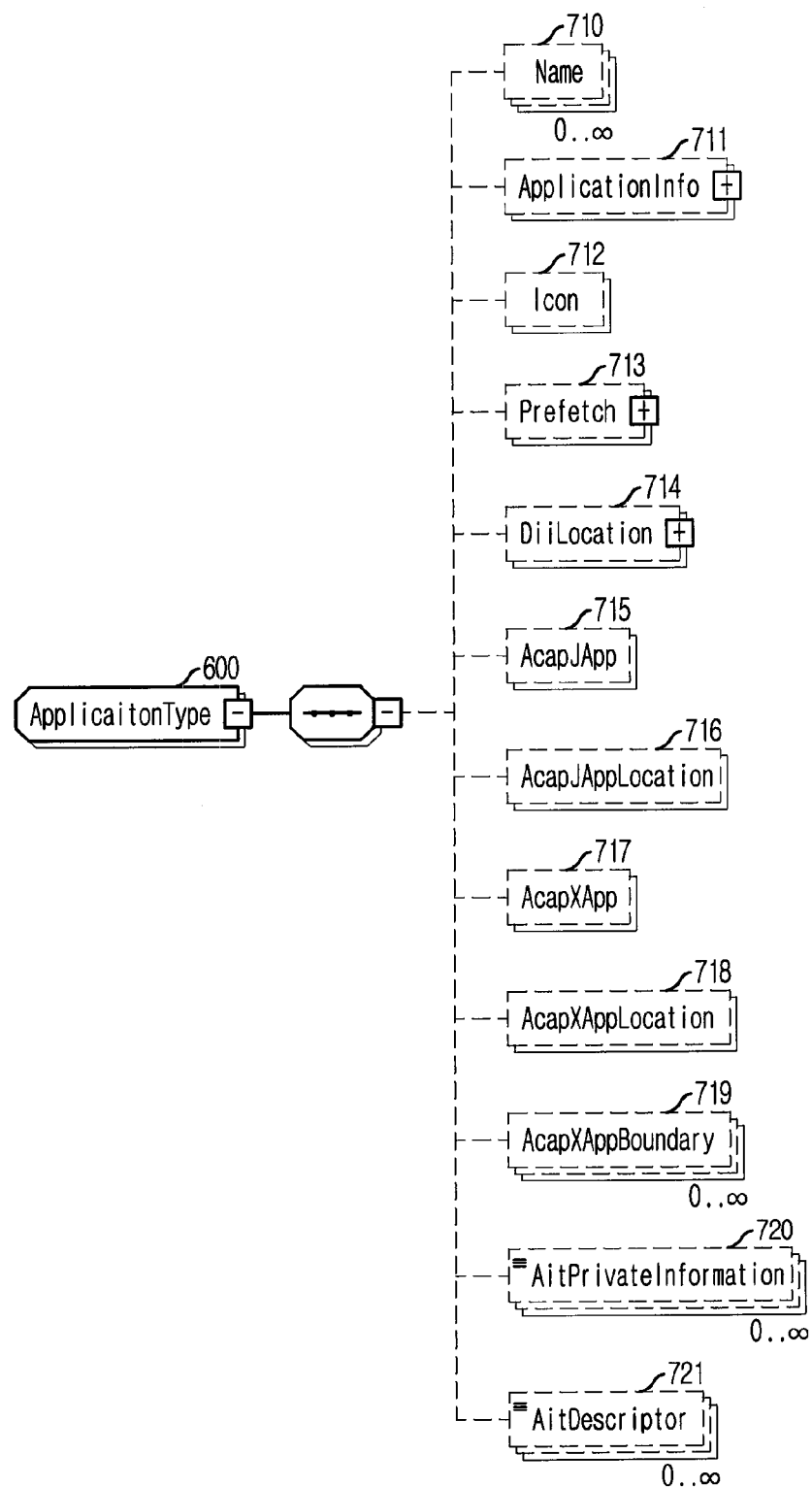
FIG. 7 is a block diagram illustrating a structure of an application metadata of FIG. 6.

FIG. 7 is a block diagram illustrating a structure of an application metadata of FIG. 6. Referring to FIG. 7, the application metadata 600 describes a specific applications descriptor. The application metadata 600 includes: a name metadata 710 for describing a name of application; an application info metadata 711 for describing general information about application; an icon metadata 712 for describing information for icons related to applications; a prefetch metadata 713 for describing information about applications stored in a cache memory; and a DII location metadata 714 for describing a list of DII messages related to an object carousel.

The application metadata 600 also include an ACAP-J App metadata 715 for describing parameters for starting an ACAP-J based application; an ACAP-J App location metadata 716 for describing information of location of an ACAP-J based application; an ACAP-X App location metadata 717 for describing information for parameters for starting an ACAP-X based application; an ACAP-X App location metadata 718 for describing information of location of an ACAP-X based application; an ACAP X App boundary metadata 719 for describing data parameters of an ACAP-X based application, an AIT private information metadata 720, and an AIT descriptor metadata 721.

Figure 8:
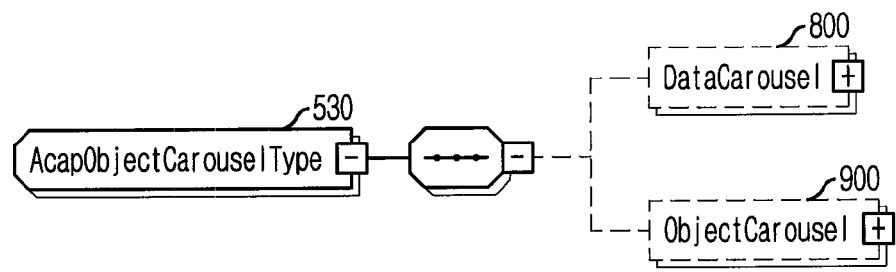
FIG. 8 is a block diagram illustrating a structure of a ACAP object carousel metadata of FIG. 5.

FIG. 8 is a block diagram illustrating a structure of an ACAP object carousel metadata of FIG. 5. Referring to FIG. 8, an ACAP object carousel metadata describes encapsulation information and AIT signaling information defined in the ACAP.

The ACAP object carousel metadata 530 includes data carousel metadata 800 for describing information for a data carousel transmitting an object carousel message; and an object carousel metadata 900 for describing information about an object carousel transmitting an ACAP application.

Figure 9:
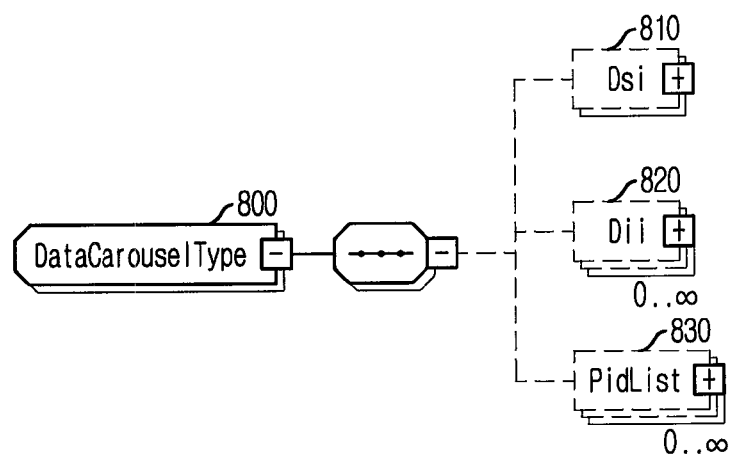
FIG. 9 is a block diagram illustrating a structure of a data carousel metadata of FIG. 8.

FIG. 9 is a block diagram illustrating a structure of a data carousel metadata of FIG. 8. Referring to FIG. 9, the data carousel metadata 800 includes a DSI metadata 810 for describing information about a download server initiate (DSI) message which is one of data carousel messages; a DII metadata 820 for describing information about a download info indication (DII); and a PID list metadata 830 for describing packet identifier transmitting a data carousel message.

Figure 10:
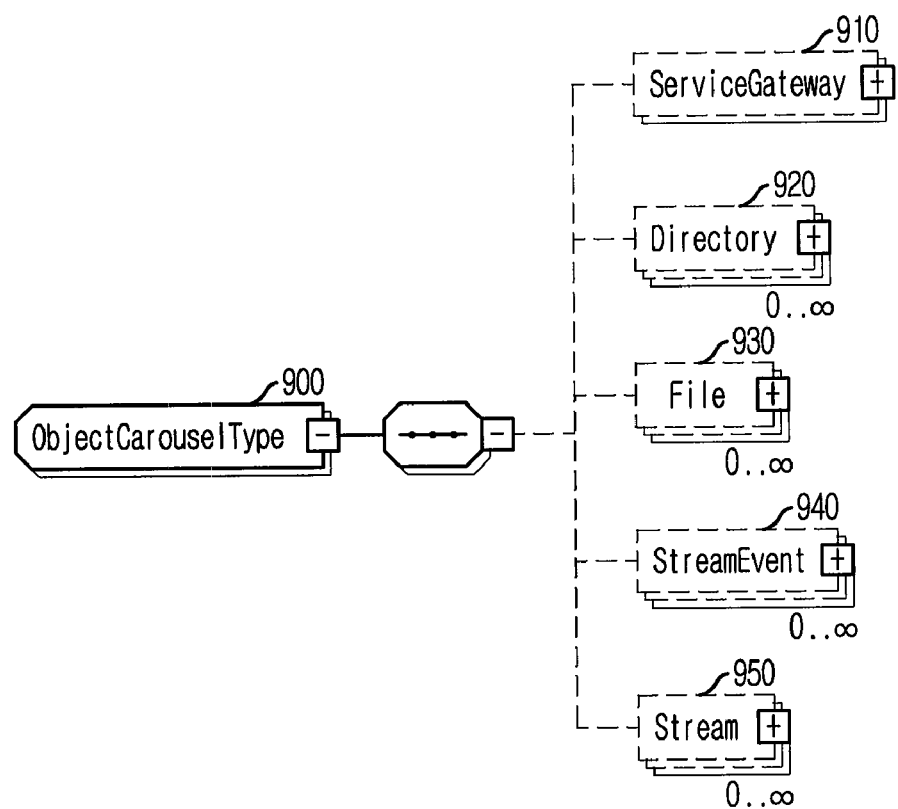
FIG. 10 is a block diagram illustrating a structure of an object carousel metadata of FIG. 8.

FIG. 10 is a block diagram illustrating a structure of an object carousel metadata of FIG. 8. The object carousel metadata 900 describes encapsulation information defined in the ACAP.

As shown in FIG. 10, the object carousel metadata 900 includes a service gateway metadata 910 for describing a service gateway message among object carousel messages; a directory metadata 920 for describing a directory object message of an abject carousel; a file metadata 930 for describing a file message of an object carousel; a stream event metadata 940 for describing a stream event message of an object carousel; and a stream metadata 950 for describing a stream message of an object carousel.

Figure 11:
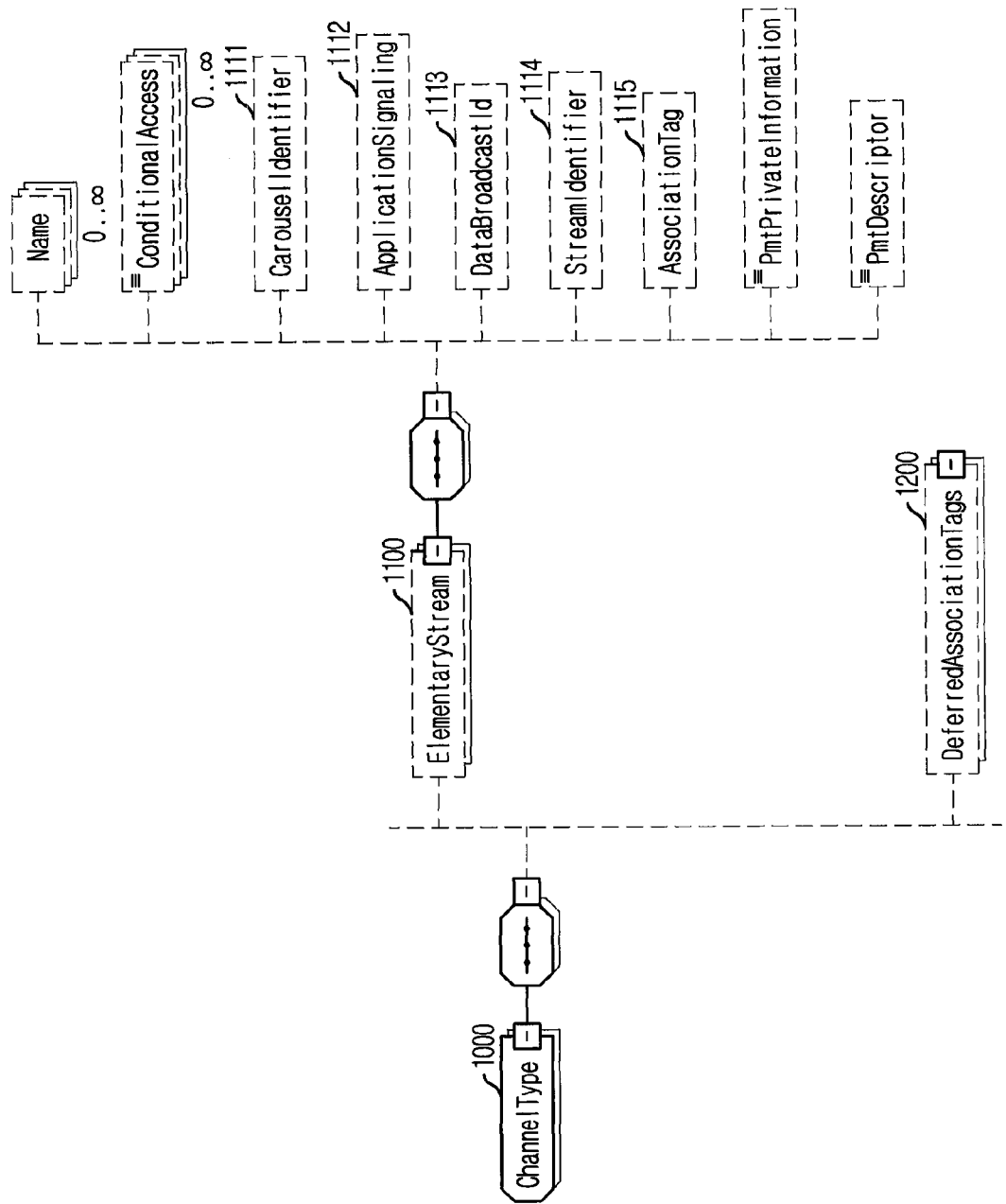
FIG. 11 is a block diagram illustrating a structure of a channel metadata of FIG. 3.

FIG. 11 is a block diagram illustrating a structure of a channel metadata of FIG. 3. The channel metadata 1000 defined in FIG. 3 further include a metadata for describing information about a program map table descriptor unlike a conventional channel metadata 230. The PMT provides information about an element stream of a program, and is used for signaling the application with the AIT as defined in the ACAP.

As shown in FIG. 11, the channel metadata 1000 further includes a metadata 1200 for describing "deffered_association_tag descriptor" which is a PMT descriptor unlike a conventional channel metadata 230. Also, the channel metadata 1000 further includes lower level metadata under the element stream metadata 1100 unlike the conventional channel metadata 230. The lower level metadata under the element stream metadata 1100 includes a carousel identifier metadata 1111 for describing a carousel ID descriptor that is a PMT descriptor defined for ACAP data broadcasting; an application signaling metadata 1112 for describing an application signaling descriptor; a data broadcasting ID metadata 1113 for describing a data broadcast ID descriptor; a stream ID metadata 1114 for describing a stream identifier descriptor; and an association Tag metadata 1115 for describing an association tag descriptor.

Figure 12:
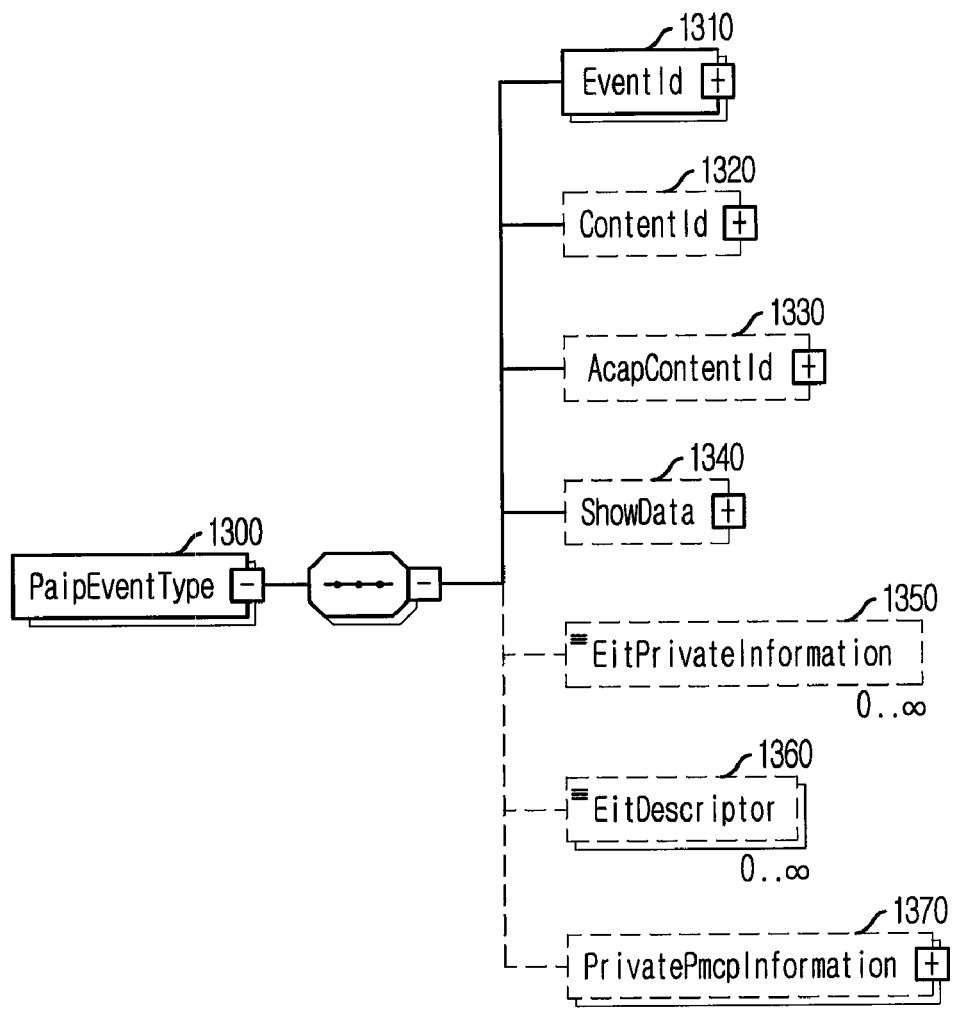
FIG. 12 is a block diagram illustrating a structure of a PSIP event metadata of FIG. 3.

FIG. 12 is a block diagram illustrating a structure of a PSIP event metadata of FIG. 3. The event identifier metadata 1300 describes identifier information of an AV event constituting a broadcasting program composed of audio and video. The event identifier metadata 1300 also include a channel number corresponding to a predetermined AV event and a transport stream identifier (TSID). The event identifier metadata 1300 further include one of an event ID, an initial starting time and an ID allocated by a producer.

The content identifier metadata 1320 describes the identifier information of contents constituting an AV event, and includes an international standard audiovisual number (ISAN), and ID information allocated to contents by a broadcasting state.

The data broadcasting content ID metadata 1330 describes the identifier information of data broadcasting contents constituting a data event. The data broadcasting content ID metadata 1330 includes an ISAN and ID information uniquely allocated to contents by a broadcasting state.

The show data metadata 1340 describes show information constituting the AV event, and includes information about a title, a summary and a rating of show.

The EIT private information metadata 1350 is for recording user-defined private information to an event information table (EIT) composing the audio/video broadcasting program.

The EIT descriptor metadata 1360 describes descriptor information of an EIT, and includes a descriptor tag number and descriptor contents.

FIG. 13 is a block diagram illustrating a structure of a PMCP extended message generated using a PMCP extended metadata in accordance with an embodiment of the present invention.

As noticed from a "PmcpMessage" attribute, a system transmitting a message according to the present invention is a traffic system, and a system for receiving this message is an ACAP data server.

As noticed from a "channel" element, a number is 11-1, and a TSID is 101. The packet identifier (PID) of an ACAP data element is set as 210, and the PID of AIT element is set as 260. Also, the PID of video element is set as 48 and the PID of audio element stream is set as 49.

As noticed from a "PsipDataEvent" element, the program guide of data broadcasting is set as following. For example, the start time is defined as 2005-10-27T04:30:00+09:00, and the duration is defined as PT50M.

Figure 14:
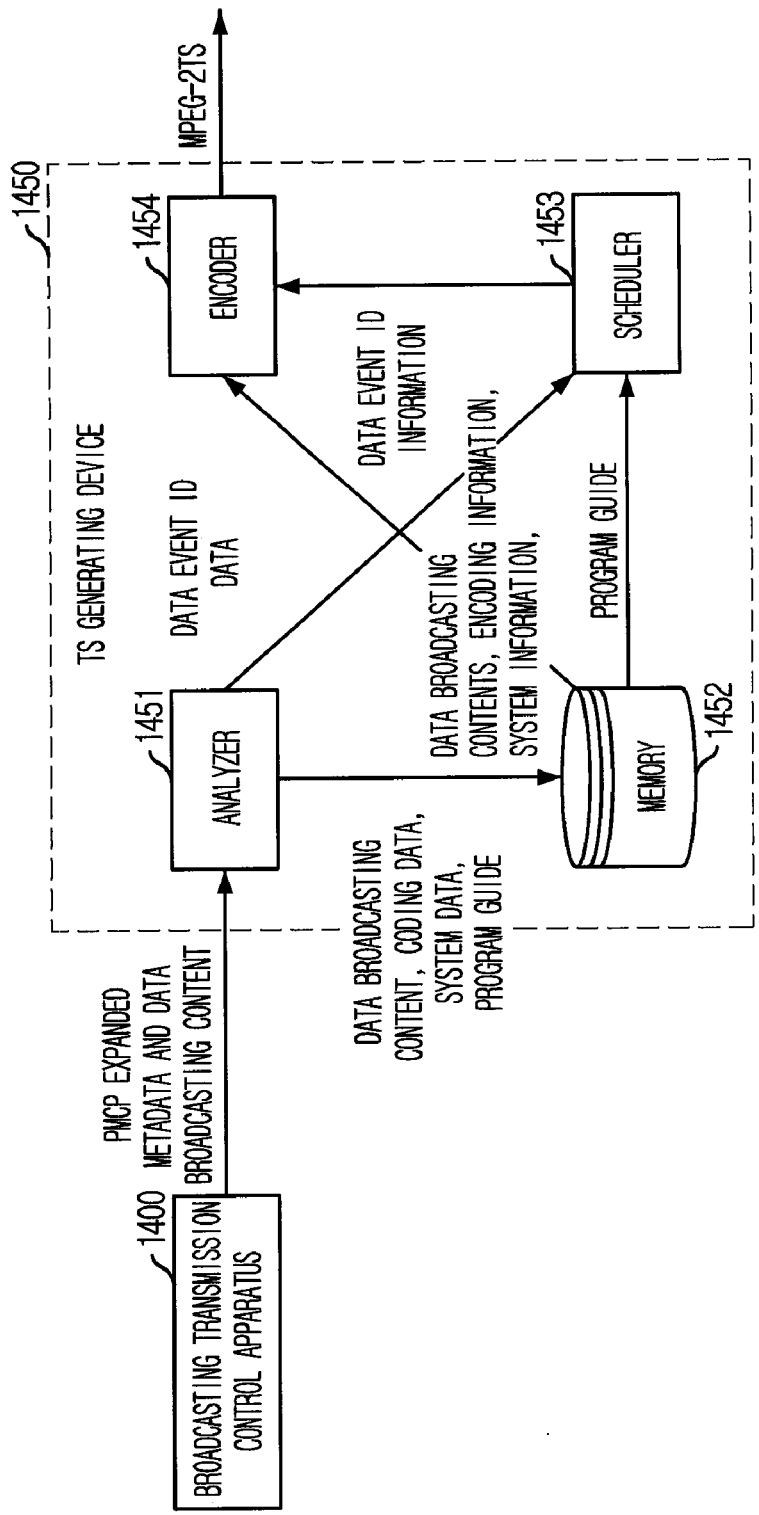
FIG. 14 is a block diagram illustrating a digital data broadcasting emitting system using a PMCP extended metadata in accordance with an embodiment of the present invention.

FIG. 14 is a block diagram illustrating a digital data broadcasting emitting system using a PMCP extended metadata in accordance with an embodiment of the present invention. The broadcasting emitting system using a PMCP extended metadata according to the present embodiment includes a broadcasting transmission controlling device 1400 and a data stream generating device 1450.

The broadcasting transmission controlling device 1400 generates encoding information and program guide for a data broadcasting program using the PMCP extended metadata according to the present invention. The broadcasting transmission controlling device 1400 also control the output of a transport stream of a data broadcasting program according to the generated program guide.

The broadcasting transmission controlling device 1400 includes a program management system, a traffic system, an automation system, a metadata extractor, a data encoding information editor, a MPEG controller, a file server for storing and managing data broadcasting content, and a data agent for transmitting data updated to a database.

The broadcasting transmission controlling device 1400 can update the program guide and data broadcasting contents using the PMCP extended metadata before transmitting a transport stream. In this case, the broadcasting controlling device 1400 updates data, and notifies the update of the data to the data stream generating device 1450 using the PMCP extended metadata.

The data stream generating device 1450, that is, a data server, generates a transport stream according to data event information described in the PMCP extended metadata such as program guide, system information and encoding information.

The data server can generate not only a data stream that has an AIT, an object carousel, and a stream descriptor, but also a PSIP table as a transport stream. The data server creates the AIT according to a metadata describing signaling information, and encapsulates data according to metadata that describes information about the object carousel that is a protocol for transmitting an ACAP application. The data server also creates a stream descriptor according to metadata describing information about a DSM-CC stream descriptor.

The data stream generating device 1450 includes an analyzer 1451, a memory 1452, a scheduler 1453, and an encoder 1454. The analyzer 1451 receives the PMCP extended metadata and data broadcasting contents from a broadcasting transmission controlling device 1400. The analyzer 1451 analyzes the transmitted PMCP extended metadata and registers system information, program guide and encoding information with data broadcasting contents to the memory 1452.

The analyzer 1451, as shown in FIG. 3, may obtain program guide from the properties of a PSIP data event metadata 400.

The analyzer 1451, as shown in FIG. 4, may obtain system information from a corresponding channel metadata 700 using a data event ID of a data event ID metadata 410.

The analyzer 1451 may obtain encoding information from the ACAP data service metadata 500.

The analyzer 1451 transmits program guide searching information. The data event ID that identifies a PMCP extended metadata is used as program guide searching information. As shown in FIG. 8, if a data event and AV event have same program guide, an event ID is used as program guide searching information because additional data event ID is not present. The analyzer 1451 may provide a data event ID for one or more data events to the scheduler 1453.

The scheduler 1453 obtains program guide for a data event from the memory 1452 using the data event ID from the analyzer 1451. The scheduler 1453 inspects a time of outputting data broadcasting contents of a data event as a transport stream using the obtained program guide. The scheduler 1453 transmits data broadcasting contents searching information, that is, a data event ID, to the encoder 1454 at a time of outputting any data event for searching data broadcasting contents corresponding to the data event. If the data event and AV event have same program guide, an event ID is used as the data broadcasting searching information because the additional data event ID is not present.

The encoder 1454 obtains data broadcasting contents, encoding information and system information from the memory 1452 using the data event ID or the event ID transmitted from the scheduler 1453. The encoder 1454 creates transport streams for the obtained data broadcasting contents, encoding information and system information and outputs the created transport streams to a user terminal.

Figure 15:
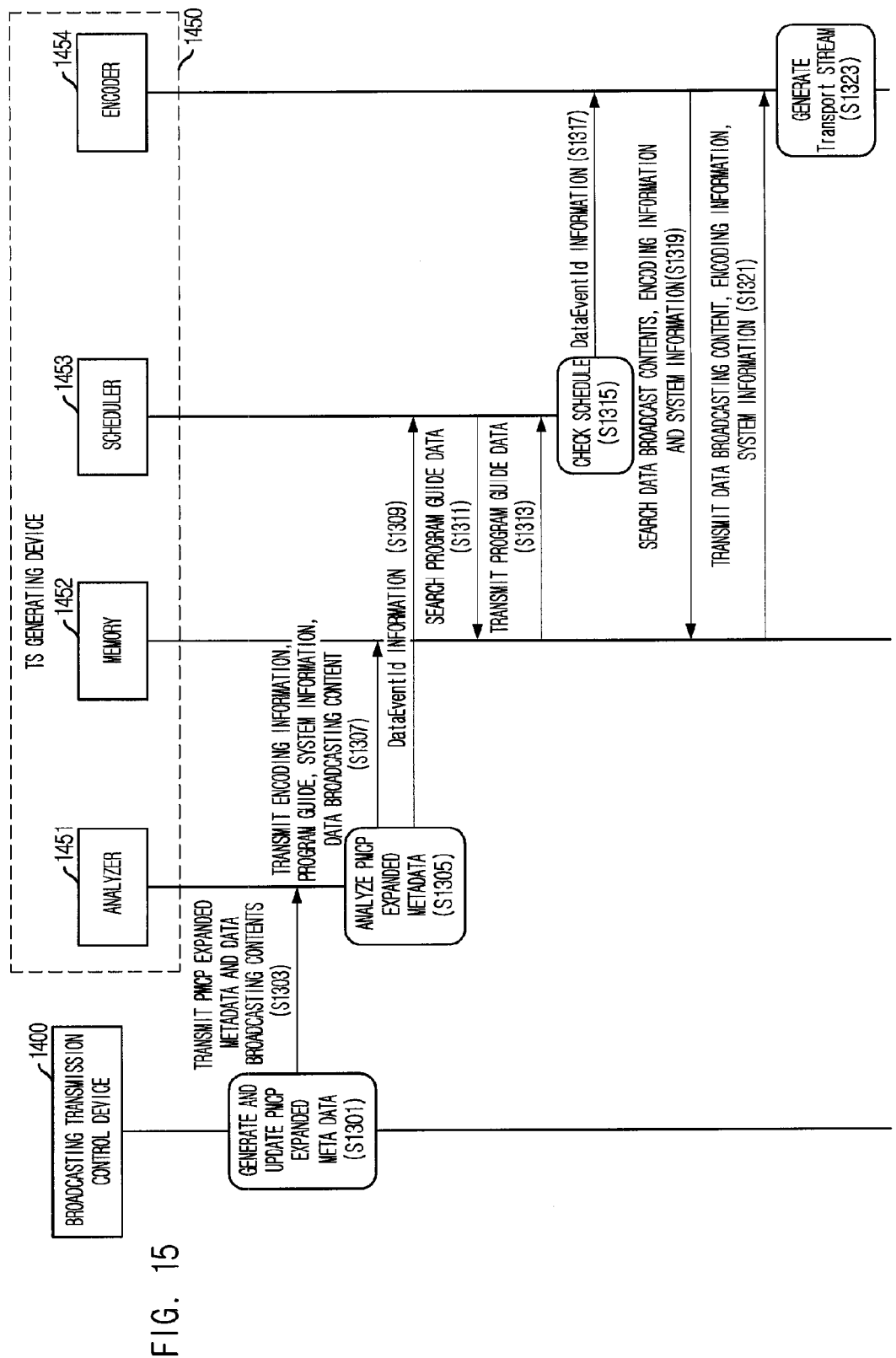
FIG. 15 is a flowchart illustrating a digital data broadcasting emitting method using a PMCP extended metadata in accordance with an embodiment of the present invention.

FIG. 15 is a flowchart illustrating a digital data broadcasting emitting method using a PMCP extended metadata in accordance with an embodiment of the present invention.

As shown in FIG. 15, the broadcasting transmission controlling device 1400 creates a PMCP extended metadata by creating and adding encoding information and schedule information for data event for data broadcasting to a conventional DMCP metadata 200 at step S1301. Then, the broadcasting transmission controlling device 1400 transmits the created PMCP extended metadata and data broadcasting contents to the analyzer 1451 of the data stream generating device 1450 at step S1303.

When data broadcasting program guides or data broadcasting contents are added, deleted or updated, the broadcasting transmission controlling device 1400 updates a previously created PMCP extended metadata at step S1301 and transmits the updated PMCP extended metadata to the analyzer 1451 of the transport stream generating device 1500 at step S1303.

The analyzer 1251 analyzes the PMCP extended metadata at step S1305, and registers program guide, system information, encoding information and data broadcasting contents at the memory 1452 at step S1307. Furthermore, the analyzer 1451 transmits the program guide searching information such as a data event ID or an event ID to the scheduler 1453 at step S1309.

The scheduler 1453 searches and obtains a program guide for a data event among information registered in the memory 1452 based on the program guide searching information at steps S1311 and S1313.

The scheduler 1453 controls the data encoder 1454 to transmit data broadcasting contents corresponding to a data event according to data event program guide received from the memory 1452. In more detail, the scheduler 1453 inspects a schedule. If the scheduler 1453 determines that it is a time for transmitting a data event at step S1315, the scheduler 1453 transmits a data event ID corresponding to the data broadcasting searching information, that is, a data event, to the encoder 1454 at step S1317.

The encoder 1454 searches and obtains data broadcasting contents, system information and encoding information using the data event Id at steps S1319 and S1321. The encoder 1454 creates transport streams for the obtained data broadcasting contents, system information and encoding information and transmits the created transport streams to a user terminal at step S1323. The scheduler 1453 stops the encoder 1454 to output the transport stream at a time of terminating the data event.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2005-0076723, filed in the Korean Intellectual Property Office on Aug. 22, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A computer implemented system for identifying components of extended metadata, the system comprising:
a processor and a memory, the memory having stored thereon:
a data event metadata comprising program guide information of data events constituting a data broadcasting, wherein the program guide information comprises event identification information of the data events and content identification information of the data events; and
a data service metadata comprising the content identification information of the data events, encoding information and signaling information for the data broadcasting,
wherein the extended metadata is defined with extension from a program metadata communication protocol (PMCP),
wherein the PMCP is configured to provide metadata comprising program guide information for each of audio, video, audio and video constituting audio, video, and audio and video broadcasting, and the data events constituting the data broadcasting,
wherein the encoding information comprises a data carousel including a Download Server Initiate (DSI) message, a Download Info Indication (DII) message and a Packet Identifier (PID) and an object carousel including a service gateway message, a directory message, a file message, a stream message and a stream event message, and the signaling information comprises Application Information Table (AIT) signaling information including information for describing characteristics of an application and identifying the application, information for describing a transmit protocol, location information of the Download Info Indication (DII) and Application Information Table (AIT) information wherein the content identification information of the data events constituting the data broadcasting is transmitted with each of the audio, video, and audio video broadcasting, and wherein the PMCP is used as an interface to update the data events from a change of contents of the data broadcasting.

2. The extended metadata as recited in claim 1, wherein the data event metadata is defined based on a program and system information protocol (PSIP), and the program guide information is updated according to a change of contents of the data broadcasting.

3. The extended metadata as recited in claim 2, wherein the program guide information further comprises title information of the data events expressed in multi-language, supplementary information of the data events, receiving information of the data broadcasting and Data Event Table (DET) information.

4. The extended metadata as recited in claim 1, wherein the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

5. The extended metadata as recited in claim 1, wherein the encoding information comprises information for encapsulation.

6. A method for generating data stream, comprising the steps of:

acquiring a program guide information, encoding information and signaling information from an extended metadata, wherein the extended metadata comprises a data event metadata comprising the program guide information of data events constituting a data broadcasting and a data service metadata comprising content identification information of the data events, the encoding information and the signaling information for the data broadcasting, and wherein the program guide information comprises event identification information of the data events and the content identification information of the data events; and generating the data stream by encoding data broadcasting contents which fits to the program guide of the data events according to the encoding information and the signaling information and wherein the encoding information comprises a data carousel including a Download Server Initiate (DSI) message, a Download Info Indication (DII) message and a Packet Identifier (PID) and an object carousel including a service gateway message, a directory message, a file message, a stream message and a stream event message, and the signaling information comprises Application Information Table (AIT) signaling information including information for describing characteristics of an application and identifying the application, information for describing a transmit protocol, location information of the Download Info Indication (DII) and Application Information Table (AIT) information, wherein the extended metadata is defined with extension from a program metadata communication protocol (PMCP), and wherein the PMCP is configured to provide metadata comprising program guide information for each of audio, video, audio and video, and the data events constituting the data broadcasting, and wherein the PMCP is used as an interface to update all change of contents of the program guide information for each of the audio, video, audio and video, and the data events constituting the data broadcasting.

7. The method as recited in claim 6, wherein the data event metadata is defined based on a program and system information protocol (PSIP), and the program guide information is updated according to a change of contents of the data broadcasting.

8. The method as recited in claim 7, wherein the program guide information further comprises title information of the data events expressed in multi-language, supplementary information of the data events, receiving information of the data broadcasting and Data Event Table (DET) information.

9. The method as recited in claim 6, wherein the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

10. The method as recited in claim 6, wherein the encoding information comprises information for encapsulation.

11. An apparatus for generating data stream, comprising:

a processor and a non-transitory computer readable recording medium, the non-transitory computer readable recording medium having stored thereon:

an analyzer configured to acquire a program guide information, encoding information and signaling information from an extended metadata, wherein the extended metadata comprises a data event metadata comprising the program guide information of data events constituting a data broadcasting and a data service metadata comprising content identification information of the data events, the encoding information and the signaling information for the data broadcasting, and wherein the program guide information comprises event identification information of the data events and the content identification information of the data events; and a encoder configured to generate the data stream by encoding data broadcasting contents which fits to the program guide of the data events according to the encoding information and the signaling information Wherein the encoding information comprises a data carousel including a Download Server Initiate (DSI) message, a Download Info Indication (DII) message and a Packet Identifier (PID) and an object carousel including a service gateway message, a directory message, a file message, a stream message and a stream event message, and the signaling information comprises Application Information Table (AIT) signaling information including information for describing characteristics of an application and identifying the application, information for describing a transmit protocol, location information of the Download Info Indication (DII) and Application Information Table (AIT) information, wherein the extended metadata is configured to be defined with extension from a program metadata communication protocol (PMCP), and wherein the PMCP is configured to provide metadata comprising program guide information for each of audio, video, audio and video, and the data events constituting the data broadcasting, wherein the PMCP is used as an interface to update all change of contents of the program guide information for each of the audio, video, audio and video, and the data events constituting the data broadcasting, and wherein all changes of contents of the program guide information of the data events constituting the data broadcasting is transmitted with the program guide information each time the program guide information is broadcasted.

12. The apparatus as recited in claim 11, wherein the data event metadata is defined based on a program and system information protocol (PSIP), and the program guide information is updated according to a change of contents of the data broadcasting.

13. The apparatus as recited in claim 12, wherein the program guide information further comprises title information of the data events expressed in multi-language, supplementary information of the data events, receiving information of the data broadcasting and Data Event Table (DET) information.

14. The apparatus as recited in claim 11, wherein the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

15. The apparatus as recited in claim 11, wherein the encoding information comprises information for encapsulation.

16. A method for receiving data stream, comprising the steps of:

receiving a data stream generated by encoding data broadcasting contents which fits to a program guide of a data events according to encoding information and signaling information, wherein the program guide information, the encoding information and the signaling information are acquired from an extended metadata, wherein the extended metadata comprises a data event metadata comprising the program guide information of the data events constituting the data broadcasting and a data service metadata comprising content identification information of the data events, the encoding information and the signaling information for the data broadcasting Wherein the encoding information comprises a data carousel including a Download Server Initiate (DSI) message, a Download Info Indication (DII) message and a Packet Identifier (PID) and an object carousel including a service gateway message, a directory message, a file message, a stream message and a stream event message, and the signaling information comprises Application Information Table (AIT) signaling information including information for describing characteristics of an application and identifying the application, information for describing a transmit protocol, location information of the Download Info Indication (DII) and Application Information Table (AIT) information, and wherein the program guide information comprises event identification information of the data events and the content identification information of the data events; and decoding the data stream, wherein the extended metadata is defined with extension from a program metadata communication protocol (PMCP), wherein the PMCP is configured to provide metadata comprising program guide information for each of audio, video, audio and video, and the data events constituting the data broadcasting, and wherein the data events constituting data broadcasting are transmitted with each of the audio, video, and the audio and video or any combination thereon.

17. The method as recited in claim 16, wherein the data event metadata is defined based on in a program and system information protocol (PSIP), and the program guide information is updated according to a change of contents of the data broadcasting.

18. The method as recited in claim 17, wherein the program guide information further comprises title information of the data events expressed in multi-language, supplementary information of the data events, receiving information of the data broadcasting and Data Event Table (DET) information.

19. The method as recited in claim 16, wherein the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

20. The method as recited in claim 16, wherein the encoding information comprises information for encapsulation.

21. An apparatus for receiving data stream, comprising:

a receiver for receiving a data stream generated by encoding data broadcasting contents which fits to a program guide of a data events according to encoding information and signaling information, wherein the program guide information, the encoding information and the signaling information are acquired from an extended metadata, wherein the extended metadata comprises a data event metadata comprising the program guide information of the data events constituting the data broadcasting and a data service metadata comprising content identification information of the data events, the encoding information and the signaling information for the data broadcasting Wherein the encoding information comprises a data carousel including a Download Server Initiate (DSI) message, a Download Info Indication (DII) message and a Packet Identifier (PID) and an object carousel including a service gateway message, a directory message, a file message, a stream message and a stream event message, and the signaling information comprises Application Information Table (AIT) signaling information including information for describing characteristics of an application and identifying the application, information for describing a transmit protocol, location information of the Download Info Indication (DII) and Application Information Table (AIT) information, and wherein the program guide information comprises event identification information of the data events and the content identification information of the data events; and a decoder for decoding the data stream, wherein the extended metadata is configured to be defined with extension from a program metadata communication protocol (PMCP), and wherein the PMCP is configured to provide metadata comprising program guide information for each of audio, video, audio and video, and the data events constituting the data broadcasting, and wherein the data events constituting data broadcasting are transmitted with each of the audio, video, and the audio and video or any combination thereon, and wherein the data events constitute related services to be viewed at anytime during an audio, video, or an audio and video broadcasting.

22. The apparatus as recited in claim 21, wherein the data event metadata is defined based on a program and system information protocol (PSIP), and the program guide information is updated according to a change of contents of the data broadcasting.

23. The apparatus as recited in claim 22, wherein the program guide information further comprises title information of the data events expressed in multi-language, supplementary information of the data events, receiving information of the data broadcasting and Data Event Table (DET) information.

24. The apparatus as recited in claim 21, wherein the extended metadata further comprises a channel metadata for describing a virtual channel including Program Map Table (PMT) information, wherein the Program Map Table (PMT) information includes an identifier metadata of the object carousel, an application signaling metadata, an identifier metadata of the data broadcasting, a stream identifier metadata, an association tag metadata and a Program Map Table (PMT) descriptor metadata.

25. The apparatus as recited in claim 21, wherein the encoding information comprises information for encapsulation.

* * * * *